United States Patent [19]
Howlett, Jr.

[11] Patent Number: 5,730,564
[45] Date of Patent: *Mar. 24, 1998

[54] CARGO LOAD SUPPORTING AIR BAG HAVING INFLATION INDICATING MEANS, AND METHOD OF DETERMINING PROPER INFLATION FOR SPACED LOADS

[75] Inventor: John Howlett, Jr., Little Rock, Ark.

[73] Assignee: Illinois Tool Works Inc., Glenview, Ill.

[*] Notice: The term of this patent shall not extend beyond the expiration date of Pat. No. 5,678,969.

[21] Appl. No.: 685,723

[22] Filed: Jul. 24, 1996

[51] Int. Cl.⁶ ............................................. B61D 45/00
[52] U.S. Cl. ................................... 410/119; 410/124
[58] Field of Search ............................. 410/31, 36, 38, 410/39, 40, 42, 117, 118, 119, 124, 125; 40/326, 412, 477; 73/700, 729.1, 729.2, 730, 731

[56] References Cited

U.S. PATENT DOCUMENTS

| | | |
|---|---|---|
| 3,960,281 | 6/1976 | Reeves . |
| 4,136,788 | 1/1979 | Robbins . |
| 4,553,887 | 11/1985 | Reeves . |
| 4,591,519 | 5/1986 | Liebel . |
| 5,263,801 | 11/1993 | Keenan et al. . |
| 5,431,515 | 7/1995 | Sansone et al. . |

Primary Examiner—Karen B. Merritt
Assistant Examiner—Gregory A. Morse
Attorney, Agent, or Firm—Schwartz & Weinrieb

[57] ABSTRACT

An air bag, and a method of using the same, for indicating proper inflation and over-inflation of the air bag when the air bag is used within a void defined between adjacent cargo loads. In accordance with a first embodiment of the invention, a plurality of horizontally disposed, vertically spaced printed lines are provided upon only one side of the inflatable air bag and extend from a side edge portion of the air bag toward a central position of the side of the air bag for a predetermined distance. When the bag is inflated, as long as the lines are visible, the bag is properly inflated. If terminal end portions of the bag become visible, the air bag is over-inflated. In accordance with a second embodiment of the invention, a single vertical line is disposed upon only one side of the inflatable bag and is located a predetermined distance from the side edge portion of the bag which corresponds to the disposition of the terminal end portions of the horizontal lines of the first embodiment. When the bag is inflated, as long as the vertical line is not visible, the bag is properly inflated, whereas if the vertical line becomes visible, the bag is over-inflated.

20 Claims, 3 Drawing Sheets

CARGO LOAD SUPPORTING AIR BAG HAVING INFLATION INDICATING MEANS, AND METHOD OF DETERMINING PROPER INFLATION FOR SPACED LOADS

CROSS REFERENCE TO RELATED APPLICATIONS

This patent application is a related to U.S. patent application Ser. No. 08/522,691, entitled AIR BAG HAVING INFLATION INDICATOR AND METHOD OF DETERMINING PROPER SPACING BETWEEN LOADS SUPPORTED THEREBY, which was filed by William J. Farrell et al. on Sep. 1, 1995.

FIELD OF THE INVENTION

The present invention relates generally to air bags for supporting loads within cargo bays of transport vehicles, and more particularly to air bags which are provided with visual indicating means for indicating to an operator whether or not the air bag is properly inflated and is, in effect, of a proper size with respect to the particular space or void defined between the adjacent cargo loads.

BACKGROUND OF THE INVENTION

It is well-known in the cargo load art to use inflatable air bags to buffer, support, or stabilize cargo loads, such as, for example, cargo containers and the like within transport vehicles, such as, for example, trains, ships, airplanes, trucks, and the like, in order to prevent the loads from shifting and becoming damaged during the shipping and handling thereof due to the existence or presence of spaces or voids between the loads. These air bags typically consist of a plastic, inflatable bladder surrounded by a suitable protective container usually fabricated from multiple plies of paper. The container prevents the bladder from being punctured or otherwise damaged by means of the loads or other objects which may be present within the cargo bay. The air bag includes an air inlet valve so that the bladder can be inflated with pressurized air from a suitable source when the air bag is to be used, or to permit the air bag to be deflated when the same is to be stored for use or subsequent reuse.

When using such air bags in connection with the support or stabilization of cargo loads, the air bag is interposed between two adjacent loads, for example, in a deflated condition and is subsequently inflated by means of pressurized air conducted into the air bag bladder through means of the air inlet valve. When properly inflated, the voids or spaces defined between the loads are properly filled, the loads are properly supported and stabilized, and safe and reliable transportation of the loads can commence. It is often difficult, however, to select the proper size air bag for use in connection with particular loads which are spaced apart from each other by means of a predetermined distance. More particularly, it is often the case that the void or space defined between the adjacent loads, and in which the particular air bag is to be placed, is too large with respect to the particularly sized air bag selected. In such a case, in order to nevertheless fill the void or space defined between the loads so as to support, buffer, or stabilize the same, the air bag is necessarily over-inflated whereby the bag is prone to rupture.

The invention disclosed within the aforenoted related patent application is directed toward a cargo load air bag which has incorporated thereon unique indicator means for visually indicating to a cargo load handler or operator when the air bag was properly inflated and also, in effect, that the particular air bag being employed in that instance was of a proper size with respect to the void or space defined between the cargo loads and which void or space is to be filled by the particularly selected air bag. While such air bags disclosed within the related patent application are of course quite satisfactory and serve the cargo industry well, it has been noted and realized that in accordance with the teachings of such disclosed air bag structures, the visual indicator means of such parent patent application comprises two sets of printed indicating indicia upon each side of the air bag when the air bag is disposed in its deflated condition. The air bags are thus rendered relatively expensive to manufacture in view of the number of printers required, the physical logistics of housing or accommodating the printers within the manufacturing facility, and the amount of ink required to print such indicating indicia upon a predetermined number of air bags.

A need therefore exists in the art for the development of a visual indicating means which may be incorporated upon air bags so as to provide a cargo load handler or operator with a visual indication of the proper inflation of the air bags, particularly in connection with the particular void or space defined between adjacent cargo loads and within which the air bag is to be placed in order to properly buffer, support, or stabilize the load, and which will permit the air bags to be more economically produced.

OBJECT OF THE INVENTION

Accordingly, it is the object of the present invention to provide a new and improved air bag, and a method of determining the proper inflation thereof, for use in connection with the support, buffering, or stabilization of cargo loads wherein the air bag has incorporated thereon visual indicator means for visually indicating to a cargo load handler or operator that the air bag is properly inflated, or in fact over-inflated, that the inflated air bag is in fact properly sized with respect to the void or space defined between the cargo loads and to be filled by means of the particular air bag selected, and which enables the cost-effective manufacture of such air bags.

SUMMARY OF THE INVENTION

The foregoing and other objectives of the present invention are achieved through the provision of an air bag, and a method of using the same to determine the proper inflation thereof as well as to verify the fact that the particularly selected air bag was of a proper size with respect to the particular cargo space or void to be filled, which comprises only one set of indicator lines, or in accordance with a second embodiment, only a single indicator line, disposed upon only one side of the air bag when the same is disposed in its deflated condition. Either embodiment of the indicating means provides a visual indication of when the air bag is properly inflated and properly sized with respect to filling the void or space defined between adjacent cargo loads disposed within a cargo bay of a transport vehicle, such as, for example, a truck, airplane, train, ship, or the like.

In accordance with a first embodiment of the present invention, a plurality of vertically spaced, horizontally disposed lines are provided along one side edge portion of the air bag, and only upon one side thereof, when the air bag is disposed in its deflated condition. When the air bag is to be used in connection with the support, buffering, or stabilization of cargo loads, the opposite side surfaces of the air bag are disposed toward the opposed surfaces of the cargo loads which define the void or space therebetween and within which the air bag is disposed. The air bag is then inflated whereupon inflation of the air bag, first end portions of the horizontal lines, which correspond to or commence their horizontal extent at the seamed side edge portion of the air bag when the latter is disposed in its deflated condition, immediately become visible to the cargo handler or operator. The horizontal lines have predetermined length dimensions as the lines extend toward the center of the side of the air bag when the air bag is in its deflated condition. Should the second free end portions of the horizontal lines become visible, or more particularly, should portions of the air bag immediately beyond such second free end portions of the horizontal lines become visible, then the cargo handler or operator is apprised of the fact that the air bag is over-inflated and that the particular air bag is too small in size with respect to the particular void or space to be filled as defined between the adjacent cargo loads.

In accordance with a second embodiment of the present invention, a single vertical line is provided upon only one side of the air bag when it is disposed in its deflated condition, and the single vertical line is disposed toward one of the side edge portions of the air bag when the latter is disposed in its deflated condition such that the single vertical line is, in effect, off-center with respect to a vertical center-line for the side surface of the deflated air bag. When the air bag is to be used in connection with the support, buffering, or stabilization of the cargo loads, the opposite side surfaces of the air bag are disposed toward the opposed surfaces of the cargo loads which define the void or space therebetween and within which the air bag is disposed. The air bag is then inflated whereupon inflation of the air bag, the single vertical line remains invisible indicating to the cargo handler or operator that the air bag has been inflated to a proper extent and that the air bag is of a proper size for filling the particular void or space defined between the adjacent cargo loads. If the single vertical line becomes visible, or still further, if portions of the air bag beyond such vertical line become visible, then such emergence of the single vertical line or such portions of the air bag beyond the single vertical line indicates to the cargo handler or operator that the air bag is in an over-inflated state or condition and is also too small in size with respect to the particular void or space to be filled between the cargo loads.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE ILLUSTRATED EMBODIMENTS

Referring now to the drawings, and more particularly to FIGS. 1–4 thereof, a first embodiment of an air bag constructed in accordance with the teachings of the related patent application, in connection with which the embodiments of the present invention will improve as will be more fully discussed hereinafter, is generally indicated by the reference character 22 and is seen to comprise visual indicator means 20 for readily and easily visually indicating to a user, cargo handler, or operator whether or not the air bag 22 is properly inflated and properly sized with respect to the void or space 24 within which the air bag 22 is disposed when the air bag 22 is inflated so as to properly support, buffer, or stabilize adjacent cargo loads 26 and 28 during transportation of the same.

Figures 1, 2, 3:
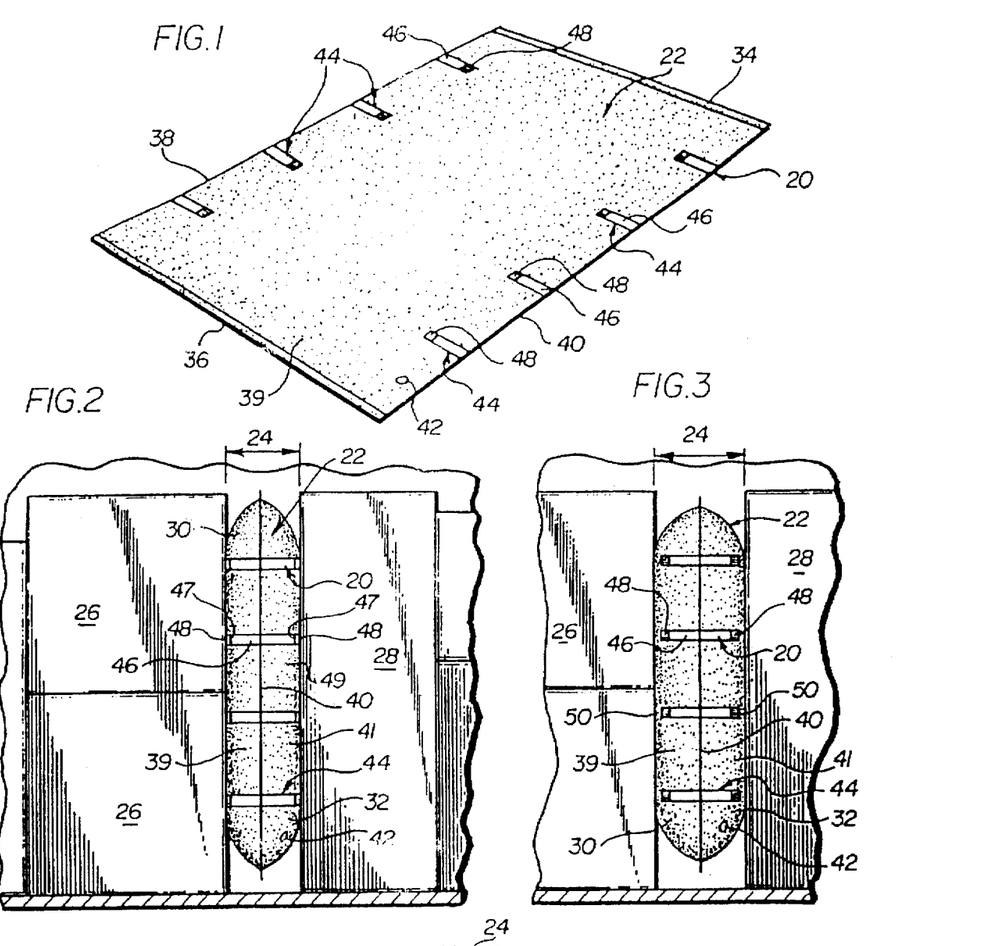
FIG. 1 is a perspective view of an air bag shown in its deflated condition and which incorporates thereon features which comprise a first embodiment of the aforenoted parent patent application.
FIG. 2 is a side elevational view showing the air bag of FIG. 1 in a properly inflated state so as to support or stabilize two cargo loads by properly filling the void defined therebetween.
FIG. 3 is a side elevational view similar to that of FIG. 2 showing however the air bag of FIG. 1 in an over-inflated state or condition and disposed within a space or void defined between the cargo loads wherein the space or void is too large for the particular air bag to properly fill the same.

The air bag 22 per se conventionally comprises an inflatable bladder, not shown, which is sealed within and surrounded by an outer container or bag. The bladder preferably comprises a seamless tube fabricated from polyethylene, rubber, or the like, and is sealed so as to be air-tight. The bladder is operatively connected to a valve 42 which is provided so as to inflate the bladder with pressurized air supplied from a suitable source, not shown. The outer container or bag within which the bladder is enclosed may be constructed in accordance with the teachings set forth in U.S. Pat. No. 4,136,788. More particularly, the outer container or bag may be a multi-ply bag comprising two sheets 30 and 32 wherein each one of the sheets 30 and 32 comprises a plurality of layers of suitable sheet material, such as, for example, paper, that is, four to eight plies. The sheets 30 and 32 are joined by suitable means along their edge portions so as to define a top seam 34, a bottom seam 36, and side seams 38 and 40, whereby the air bag 22 is provided with opposite side surfaces 39 and 41. Alternatively, a single sheet of material can be folded over upon itself and sealed along the overlapping edges thereof by any suitable means such that only a single side seam is formed upon the outer container or bag which will, of course, still comprise the opposite first and second side surfaces. The outer container or bag is provided so as to prevent the bladder from being punctured or otherwise damaged by means of the cargo loads 26 and 28, or by other objects which may be present within the cargo bay.

Considering now the first embodiment of the indicator means 20 as disclosed within FIGS. 1–4, the indicator means 20 comprises at least one marking 44 formed upon the air bag 22, and more particularly comprises an elongate line which is disposed within the vicinity of each side seam 38 and 40 so as to cross over each side seam 38 and 40 and thereby be partially disposed upon each one of the side surfaces 39 and 41. The midpoint of each marking line 44 is essentially located upon the respective side seam 38 and 40. While a plurality of vertically spaced horizontally disposed marking lines 44 are provided upon each side surface 39 and 41 of the air bag 22 and along each side edge portion of the air bag 22 as defined by side seams 38 and 40, only a single marking line 44 may be provided or used if so desired. As will be more fully discussed hereinafter, the marking lines 44 provide a user, cargo handler, or operator with a visual indication as to whether or not the air bag 22 is inflated to a proper inflation extent, and in addition, whether a properly sized air bag 22 has been employed within a particular space or void 24 as defined between the adjacent cargo loads 26 and 28.

With continued reference being made to FIGS. 1–4, each marking line 44 is seen to comprise a first indicia portion 46, and second indicia portions 48 which are different or distinguishable from the first indicia portion 46. The length of the first indicia portion 46, which is delimited by lines 47 which separate the first indicia portion 46 from the second indicia portions 48, is substantially equal to the thickness of the air bag 22 when the same is properly inflated so as to fill the void or space 24 defined between the cargo loads 26 and 28, and thus, such length of the first indicia portion 46 also represents the maximum width of the space or void 24 which can be properly filled by means of the particularly sized air bag 22. Since the distance defined between the second indicia portions 48 also essentially corresponds to the length of the first indicia portion 46, the distance defined between the second indicia portions 48 also represents the maximum width of the space or void 24 which can be properly filled by means of the air bag 22.

As has been noted hereinbefore, in order to easily observe when the air bag 22 is properly inflated, the first and second indicia 46 and 48 are readily distinguishable from each other. In particular, the first and second indicia 46 and 48 may comprise different visual designs, such as, for example, different colors or patterns. The first indicia 46 may be colored blue, for example, while the second indicia 48 may be colored red. Alternatively, the first indicia 46 may comprise a solid black line, while the second indicia 48 may comprise black and white checks, black dots upon a white background, black and white stripes, or the like. The marking lines 44 are applied to the air bag 22 by any suitable means, such as, for example, printing the marking lines 44 upon the air bag 22, and it is further noted that in lieu of the relatively shorted end indicia portions 48 as illustrated, such second indicia portions 48 can extend around peripheral portions of the air bag 22 between end portions of oppositely disposed or separated marking lines 44 provided within the vicinity of the opposite side edge seam regions 38 and 40.

When the air bag 22 is to be used to buffer, support, or stabilize the cargo loads 26 and 28, the air bag 22 is placed within the void or space 24 defined between the adjacent cargo loads 26 and 28 in its deflated condition such that the opposite side surfaces 39 and 41 thereof are disposed toward or face the opposed surfaces of the cargo loads 26 and 28. The side seams 38 and 40 of the air bag 22, with the indicating marking lines 44 thereof, are clearly visible to the user, cargo handler, or operator, and it is noted that the seams 38 and 40 will be disposed vertically while the marking lines 44 will be disposed horizontally and parallel to, for example, a support surface or floor upon which the cargo loads 26 and 28 are disposed and supported. The user or operator then inflates the air bag 22 by injecting pressurized air from a suitable source of pressurized air, not shown, into the bladder of the air bag 22 through means of the inlet valve 42, and as air is introduced into the air bag 22, the air bag 22 expands and the side faces or surfaces 39 and 41 of the air bag 22 move into engagement with the opposed surfaces of their respective loads 26 and 28. As the air bag 22 expands, the length dimension or extent of the marking lines 44 becomes increasingly visible to the user or operator. As shown in FIG. 2, the maximum thickness to which the air bag 22 should be inflated so as to properly fill the space or void 24 defined between the cargo loads 26 and 28 is indicated when the junction lines 47, defined between the first and second indicia 46 and 48, just become visible. In other words, the distance defined between the opposite junction lines 47 defines an end portion 49 of the air bag 22 which, in turn, represents or defines the maximum extent to which the air bag 22 is to be inflated and the maximum spacing defined between the loads 26 and 28 within which the particularly sized air bag 22 can be employed when properly inflated.

As shown in FIG. 3, when the void or space 24 defined between the adjacent cargo loads 26 and 28 is too wide with respect to the air bag 22 when the latter is properly inflated, or considered alternatively, when the air bag 22 is too small with respect to the particular void or space 24 defined between the adjacent cargo loads 26 and 28 when the air bag 22 is inflated so as to support, buffer, or stabilize such loads 26 and 28, the end portions or second indicia 48 of the indicator marking lines 44 are clearly visible to the user, and in some instances, even portions 50 of the air bag 22 positioned laterally beyond the second indicia portions 48 are likewise visible. Such visual indications or markings convey the fact to the user or operator that the air bag 22 is over-inflated and may therefore rupture, and in addition, that the particularly selected air bag 22 to fill the void or space 24 defined between the cargo loads 26 and 28 when inflated is in fact too small.

Figure 4:
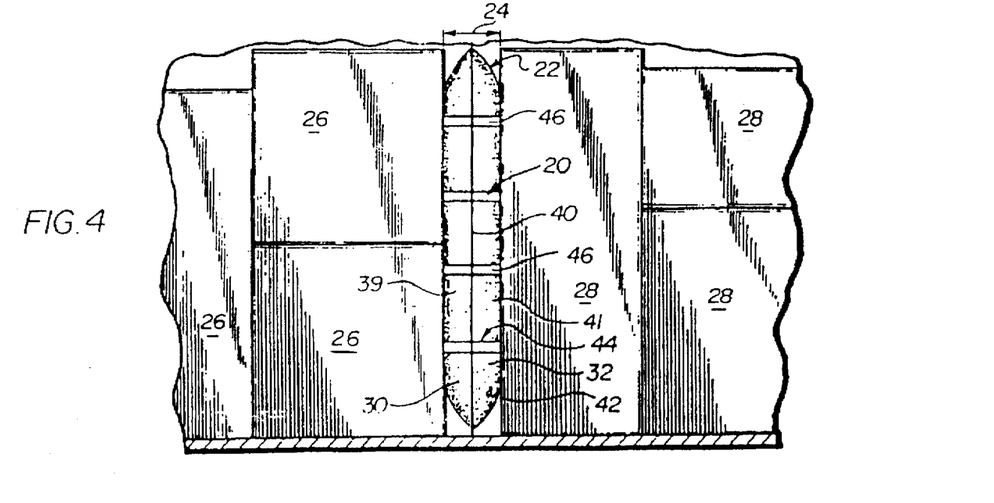
FIG. 4 is a side elevational view similar to that of FIG. 2 wherein the air bag of FIG. 1 is properly inflated but is disposed within a void or space, defined between the adjacent cargo loads, which is smaller than the void or space illustrated in FIG. 2.

As shown in FIG. 4, when the void or space 24 defined between the adjacent cargo loads 26 and 28 is relatively narrow, or in any case narrower than the voids or spaces illustrated within FIGS. 2 and 3, the entire length of the indicator marking line 44, that is, the longitudinal extent of the first indicia portion 46, will not be visible to the user or operator, and the second indicia portions 48 of the marking lines 44 will likewise not be visible to the user or operator even when the air bag 22 is inflated to its maximum extent as permitted by means of the engaged surfaces of the cargo loads 26 and 28. Under such circumstances, even though the air bag 22 is not in fact inflated to its maximum useable extent or capacity or thickness, as shown in FIG. 2, the inflated air bag 22 of FIG. 4 nevertheless provides sufficient support, buffering, and stabilization for the cargo loads 26 and 28.

Figure 5:
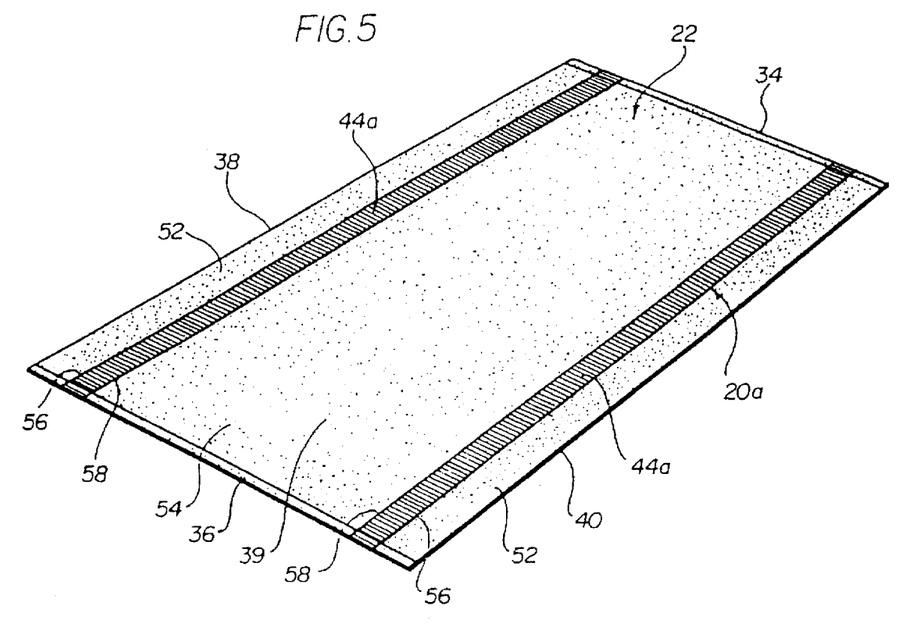
FIG. 5 is a perspective view similar to that of FIG. 1 showing however an air bag in its deflated state and which incorporates therein features which comprise a second embodiment of the aforenoted parent patent application.
Figure 6:
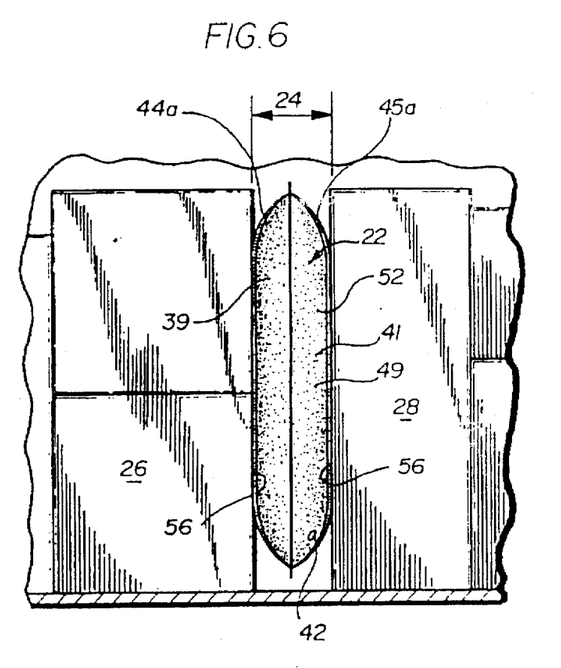
FIG. 6 is a side elevational view similar to that of FIG. 2 showing the air bag of FIG. 5 in a properly inflated state so as to support or stabilize the cargo loads by properly filling the void or space defined therebetween.
Figure 7:
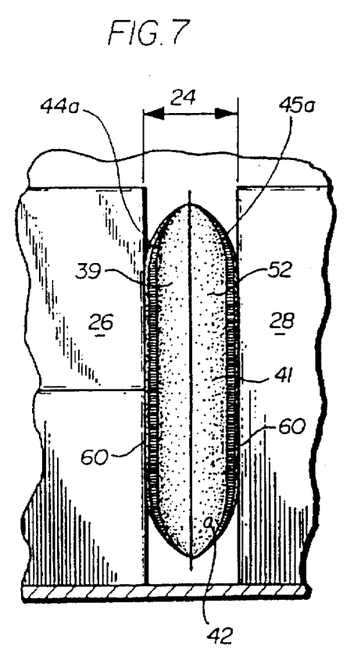
FIG. 7 is a side elevational view similar to that of FIG. 6 showing, however, the air bag of FIG. 5 in an over-inflated state or condition and disposed within a void or space defined between two cargo loads wherein the void or space is too large for the particular air bag to properly fill the same.

With reference now being made to FIGS. 5–7, a second embodiment of an air bag constructed in accordance with the teachings or principles of the related patent application is disclosed and is generally indicated by the reference character 22, with the visual indicator means thereof generally indicated by the reference character 20a. The indicator means 20a comprises at least two marking lines 44a and 45a disposed upon the opposite side surfaces 39 and 41 of the air bag 22, respectively, and as specifically illustrated, each side surface 39 and 41 of the air bag 22 is provided with a pair of marking lines 44a and 45a which are positioned within the vicinity of the side edge seams 38 and 40 of the air bag 22. The marking lines 44a and 45a extend substantially the entire length of the air bag 22 from the top seam 34 to the bottom seam 36, and each line 44a and 45a has a predetermined width as defined by means of an inner edge portion 56 and an outer edge portion 58. The inner edge portion 56 of each marking line 44a and 45a is spaced from a respective one of the side seams 38 and 40 by means of a distance which is substantially equal to one-half of the maximum thickness to which the air bag 22 is to be inflated when properly filling the void or space 24. Thus, the distance defined between paired inner edge portions 56 of paired marking lines 44a and 45a disposed upon opposite sides of each side seam 38 and 40 represents the maximum thickness to which the air bag 22 is to be inflated when properly filling the void or space 24 defined between the cargo loads, and therefore, in turn, represents the maximum width of the space or void 24 which can be properly filled by means of the air bag 22 having such a predetermined size. Thus, the marking lines 44a and 45a provide a visual indication to the user or cargo handler or operator as to whether or not the air bag 22 is properly inflated, and in addition, whether such air bag 22 is of the proper size for use within the particular void or space 24.

As was the case of the second indicia 48 of the first embodiment of the air bag 22 as shown in FIGS. 1–4, the marking lines 44a and 45a need not be solid lines but could comprise other designs, such as, for example, checks, dots, stripes, or the like, as long as the design of each marking line 44a and 45a is visually distinct from the remainder of the air bag 22 so that a person can easily visually distinguish between the marking lines 44a, 45a and the remainder of the air bag 22. Preferably, the marking lines 44a and 45a are colored, for example, a suitable shade of blue, while the remainder of the air bag 22 comprises a different color, such as, for example, a suitable shade of brown or tan. As was also the case of the indicia of the first embodiment of the air bag 22 of FIGS. 1–4, the marking lines 44a and 45a are applied to the air bag 22 by any suitable means, such as, for example, printing the same upon the air bag 22. Alternatively, the area 52 defined between the inner edge portions 56 of the marking lines 44a and 45a may have an indicia or design thereon which is different from and clearly distinguishable from the indicia, design, or color of the marking lines 44a and 45a , and similarly for the area 54 which is defined between the outer edge portions 58 of the marking lines 44a and 45a which are disposed upon the same side surface 39 and 41 of the air bag 22. Alternatively, still further, the areas 52 and 54 need not be provided with any particular indicia or design.

In a manner similar to the use of the air bag 22 of the embodiment of FIGS. 1–4, when the air bag 22 comprising the embodiment of FIGS. 5–7 is to be used to buffer, support, or stabilize cargo loads 26 and 28, the air bag 22 is placed within the void or space 24 defined between the loads 26 and 28 in a deflated condition with the side surfaces 39 and 41 thereof disposed toward the opposed surfaces of the loads 26 and 28 so that the side seams 38 and 40 are clearly visible to the user, cargo handler, or operator. When the air bag 22 is so disposed with respect to the cargo loads 26 and 28, the marking lines 44a and 45a extend vertically and are therefore perpendicular to the support surface or floor upon which the loads 26 and 28 are disposed, and at such time, the marking lines 44a and 45a are not able to be seen by the user or operator because they face the opposed side surfaces of the loads 26 and 28. The user or operator then inflates the air bag 22 by injecting pressurized air from a suitable source, not shown, into the bladder of the air bag 22 through means of the inlet valve 42, and as air in introduced into the air bag 22, the latter expands and the side surfaces 39 and 41 of the air bag 22 move into engagement with the respective side surfaces of the cargo loads 26 and 28. Eventually, when a sufficient amount of air is introduced into the air bag 22, the vertical marking lines 44a and 45a will become visible to the user or operator. More particularly, as shown in FIG. 6, the maximum thickness to which the air bag 22 should be inflated so as to be properly inflated and not over-inflated is when the inner edge portions 56 of the marking lines 44a and 45a just become visible to the user or operator. In other words, the distance defined between the inner edge portions 56 of the marking lines 44a and 45a defines an end portion 49 of the air bag 22 which, in turn, defines or determines the maximum spacing or size of the void or space between the cargo loads 26 and 28 which can be properly filled by means of the particularly sized air bag 22 when the latter is properly inflated.

As shown in FIG. 7, when the void or space 24 defined between the adjacent cargo loads 26 and 28 is too wide, that is, wider than the space or void 24 shown in FIG. 6, or in other words, when the particular air bag 22 being employed for filling such a space or void 24 is too small, the air bag 22 must be inflated to such a degree or extent that the entire widthwise extent of the marking lines 44a and 45a, including the outer edge portions 58 thereof, as well as portions 60 of the air bag 22 beyond the outer edge portions 58 of the marking lines 44a and 45a , becomes visible to the user thereby telling the user or operator that the air bag 22 is in fact over-inflated and may be susceptible to rupture. Once used, the air bag 22 may of course be disposed of or deflated by means of the valve 42 for suitable subsequent re-use.

As has been noted hereinbefore, while such air bags 22 disclosed within FIGS. 1–7, and representing the invention of the related patent application, have of course been quite satisfactory and have served the cargo handling or transportation industry quite well, it has been noted and realized that in accordance with the teachings and principles of such air bag structures 22, the visual indicator means of such air bags 22 comprises two sets of printed indicating indicia upon each side of the air bag 22 when the latter is disposed in its deflated condition. Such air bags 22 are thus relatively expensive to manufacture in view of the number of printers required, the physical logistics of housing or accommodating the printers within the manufacturing facility, and the amount of ink required to print such indicating indicia upon a predetermined number of air bags.

Figure 8:
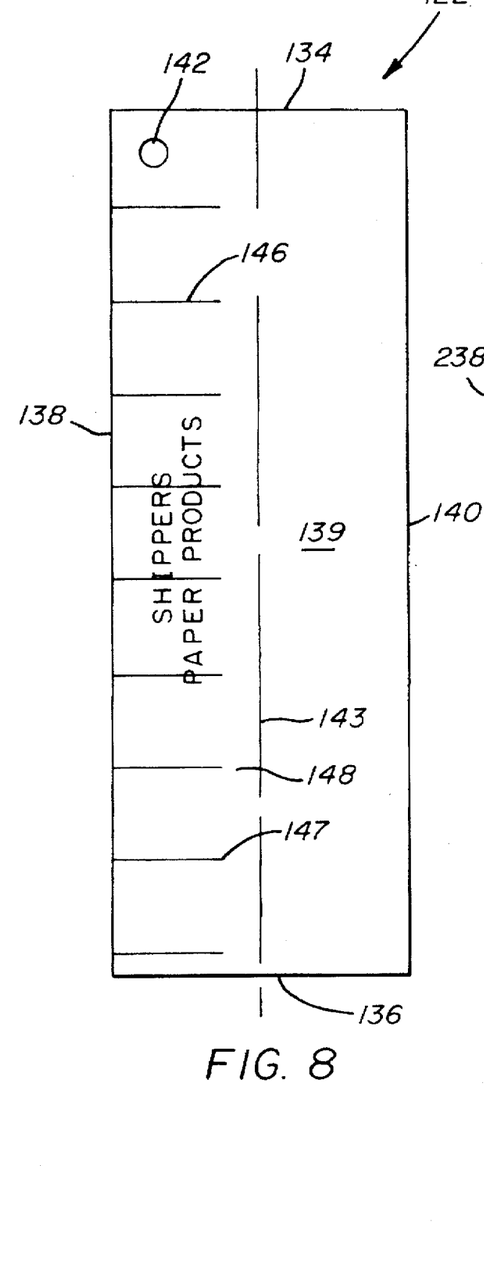
FIG. 8 is a side elevational view of a first embodiment of an air bag shown in its deflated condition and constructed in accordance with the principles of the present invention so as to comprise an improvement with respect to the air bag structures of the parent patent application.

Accordingly, the present invention is directed toward improved air bag structures which are able to be manufactured in a more cost-effective or economical manner. With reference therefore being made to FIG. 8 of the drawings, a first embodiment of an improved air bag structure developed in accordance with the principles or teachings of the present invention is disclosed and generally indicated by the reference character 122. As was the case with the air bags 22 of FIGS. 1–7, the air bag 122 may be fabricated with an internal, seamless inflatable bladder, not shown, encased within an outer container or bag which is constructed from at least two plies of paper which are sealed together by suitable means so as to define an upper seam 134, a bottom seam 136, and side seams 138 and 140. When the air bag 122 is disposed in its deflated condition, it has opposite side surfaces, only one of which 139 is shown in FIG. 8, and in order to inflate or deflate the air bag 122, the latter is provided with a suitable valve 142 which, of course, is fluidically connected to the internal inflatable bladder.

In accordance with the particular teachings of this embodiment of the present invention, only side surface 139 of the air bag 122 is provided with visual indicator means such that corresponding and cooperating indicator means previously provided upon the opposite side surface of the air bag, or upon the opposite side edge of the same side surface of the air bag is able to be omitted or eliminated thereby rendering the production or manufacture of the air bag 122 of the present invention more economical and cost-effective. More particularly, the visual indicator means of the first embodiment of the air bag 122 of the present invention, as shown in FIG. 8, is seen to comprise at least one horizontally disposed line 146, or alternatively, a single set of vertically spaced, horizontally disposed lines 146. The lines 146 are provided upon the air bag 122 by suitable means, such as, for example, printing techniques, and the lines 146 are seen to commence from the side seam 138 and extend horizontally inwardly along the side surface 139 of the air bag 122 so as to approach a centerline or midline 143 thereof, although as can be clearly seen, the longitudinal extent of each line 146 is such that the lines 146 terminate before reaching the centerline or midline 143, and the terminal end portions of the lines 146 are denoted at 147. As will become apparent shortly hereafter, the longitudinal extent of the lines 146 is directly related to the extent to which the air bag 122 may be properly inflated in order to properly fill a void or space defined between adjacent cargo loads.

More particularly, as was the case with either one of the embodiments of FIGS. 1 and 5, when the air bag 122 is to be used to properly support, buffer, or stabilize cargo loads, the air bag 122 is positioned between the cargo loads in its deflated condition and with the side surface 139, as well as its other side surface, not shown, disposed toward or facing the opposed surfaces of the cargo loads. At such time, the side seam 138 will be facing the user, cargo handler, or operator. As the air bag 122 is inflated by means of pressurized air introduced into the air bag 122 through means of the inlet valve 142, the air bag 122 starts to expand and the side surface 139, as well as the other side surface thereof, not shown, begin to engage the opposed surfaces of the cargo loads. When the air bag 122 was initially interposed between the cargo loads in its deflated condition, the marking lines 146 could not be seen by the user or operator because the side surface 139 was disposed toward one of the cargo load surfaces. Upon inflation of the air bag 122, however, the marking lines 146 become progressively more visible. Proper inflation of the air bag 122 is thus indicated to the user or operator as long as the marking lines 146 are visible and as long as the terminal end portions 147 of the marking lines 146 remain invisible or not visible to the user or operator. If the terminal end portions 147 of the marking lines 146 are clearly visible to the user or operator, or if additional portions or regions 148 of the air bag 122, which are beyond the terminal end portions 147 of the marking lines 146, are visible to the user or operator, then the user or operator is apprised of the fact that the air bag 122 is over-inflated and is also therefore too small in size with respect to the particular void or space with which the air bag 122 is being used in order to properly fill such void or space and thereby properly support, buffer, or stabilize the cargo loads without incurring any risk of rupture due to such over-inflation. It is also to be appreciated, from another point of view, that the longitudinal extents of the marking lines 146 are substantially equal to approximately one-half the thickness of the inflated air bag 122 when the air bag 122 is properly inflated so as to properly fill the cargo void or space, or in still other words, such longitudinal extents of the marking lines 146 are substantially equal to approximately one-half the distance separating the cargo loads from each other wherein such distance defines the aforenoted cargo space or void to be filled by the air bag 122.

Figure 9:
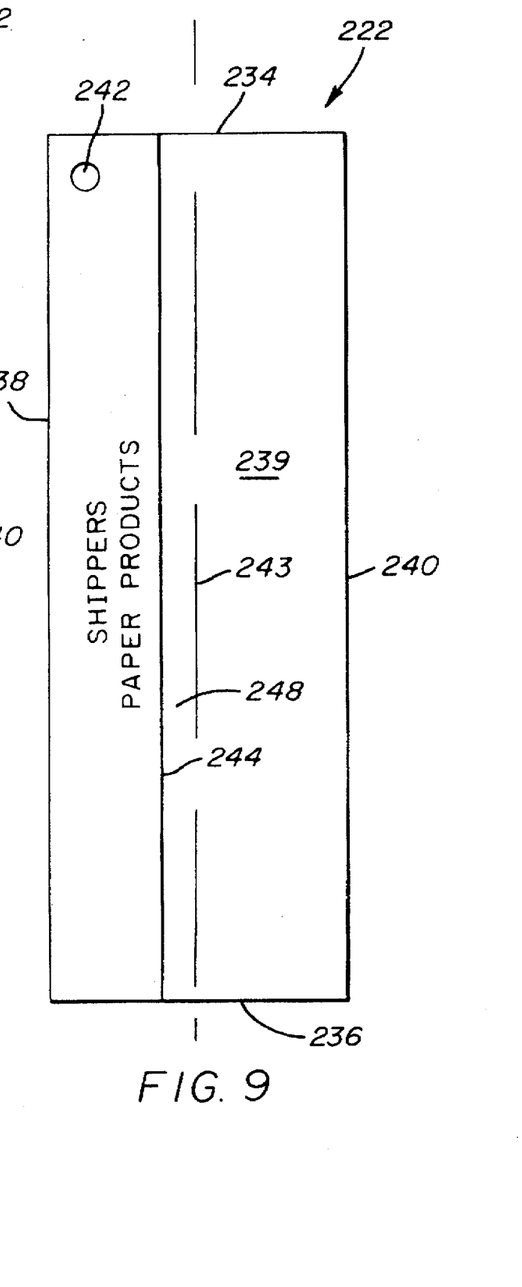
FIG. 9 is a side elevational view of a second embodiment of an air bag shown in its deflated condition and constructed in accordance with the principles of the present invention so as to comprise an additional improvement with respect to the air bag structures of the parent patent application.

Referring now to FIG. 9, a second embodiment of an improved air bag structure developed in accordance with the principles and teachings of the present invention is disclosed and generally indicated by the reference character 222. As was the case with the air bags 22 and 122 of the previous embodiments, the air bag 222 may be fabricated with an internal seamless inflatable bladder, not shown, encased within an outer container or bag which is constructed from at least two plies of paper which are sealed together by suitable means so as to define an upper seam 234, a bottom seam 236, and side seams 238 and 240. When the air bag 222 is disposed in its deflated condition, it has opposite side surfaces, only one of which 239 is shown in FIG. 9, and in order to inflate or deflate the air bag 222, the latter is provided with a suitable valve 242 which, of course, is fluidically connected to the internal inflatable bladder.

In accordance with the particular teachings of this embodiment of the present invention, only one side surface 239 of the air bag 222 is provided with visual indicator means such that, as was the case with the embodiment of FIG. 8, corresponding and cooperating indicating means previously provided upon the opposite side surface of the air bag, or upon the opposite side edge of the same side surface of the air bag, is able to be omitted or eliminated thereby rendering the production or manufacture of the air bag 222 of the present invention more economical and cost-effective. More particularly, the visual indicator means of this second embodiment of the air bag 222 of the present invention, as shown in FIG. 9, is seen to comprise a single vertically extending line 244. The line 244 is provided upon the air bag 222 by suitable means, such as, for example, printing techniques, and the line 244 extends from the upper seam 234 to the bottom seam 236. It is also to be appreciated that the line 244 is disposed to the left of the centerline or midline 243 of the side surface 239 of the air bag 222. More particularly, the disposition of the vertical indicating line 244 with respect to the side surface 239 of the air bag 222 is precisely the same as the disposition of the terminal end portions 147 of the indicating lines 146 of the air bag embodiment 122 shown in FIG. 8. In other words, if a vertical line or locus was superimposed upon the indicating means 146 of the air bag 122 of FIG. 8 so as to interconnect the terminal end portions 147 of the lines 146, such line or locus would correspond to the vertical line 244. As will become more apparent hereinafter, the disposition of the vertical indicating line 244 upon the side surface 239 of the air bag 222, that is, the distance that the indicating line 244 is spaced from the side seam 238, is directly related to the extent to which the air bag 222 may be properly inflated in order to properly fill the void or space defined between adjacent cargo loads with which the air bag 222 is being used, as was the indicating significance of the indicating lines 146.

More particularly, as was the case with either one of the embodiments of FIGS. 1 and 5, as well as the first embodiment of the present invention as shown in FIG. 8, when the air bag 222 is to be used to properly support, buffer, or stabilize the cargo loads, the air bag 222 is positioned between the spaced cargo loads while in its deflated condition and with the side surface 239 thereof, as well as the other side surface thereof, not shown, disposed toward or facing the opposed surfaces of the cargo loads. At such time, the side seam 238 will be facing the user or operator. As the air bag 222 is inflated by means of pressurized air introduced into the air bag 222 through means of the valve 242, the air bag 222 starts to expand and the side surface 239, as well as the other side surface thereof, not shown, begin to engage the opposed surfaces of the cargo loads. When the air bag 222 was initially interposed between the cargo loads in its deflated condition, the single marking or indicating line 244 could not be seen by the user or operator because the side surface 239 of the air bag 222 was disposed toward one of the opposed surfaces of the cargo loads. Upon inflation of the air bag 222, the vertical indicating or marking line 244 remains invisible or not visible to the operator or user due to its particular disposition or location upon the side surface 239 of the air bag 222. Consequently, in accordance with this embodiment of the present invention, as long as the vertical indicating line 244 is not visible to the user, cargo handler, or operator, the air bag 222 is disposed in a properly inflated state or condition. If, however, the vertical indicating or marking line 244 becomes visible to the user or operator, or if additional portions or regions 248 of the air bag 222, which are beyond the vertical marking or indicating line 244 as one proceeds toward the centerline or midline 243, become visible to the user or operator, then the user or operator is apprised of the fact that the air bag 222 is over-inflated and is also therefore too small in size with respect to the particular void or space with which the air bag 222 is being used in order to properly fill such void or space and thereby properly support, buffer, or stabilize the cargo loads without incurring any risk of rupture due to such over-inflation. It is also to be appreciated, from another point of view, that the distance defined between the side seam 238 and the vertical indicating line 244 is substantially equal to approximately one-half the thickness of the inflated air bag 222 when the air bag 222 is properly inflated so as to properly fill the cargo void or space, or in still other words, the aforenoted distance defined between the side seam 238 and the vertical indicating line 244 is substantially equal to approximately one-half the distance separating the cargo loads from each other wherein such distance separating the cargo loads defines the cargo space or void to be filled by the air bag 222.

Thus it may be seen that the air bags of the present invention comprise improvements within the cargo load art and also comprise improvements in connection with the air bags of the aforenoted related patent application in that the air bags of the present invention provide visual indicating means for indicating the proper inflation of the air bags within cargo load voids or spaces as well as whether or not the air bags are properly sized with respect to the cargo load spaces or voids being filled by means of such air bags. More particularly, the air bags of the present invention need to have the inflation indicating means provided upon only one side surface of the air bag and only within the vicinity of one side edge or seam portion thereof when the air bag is viewed in its deflated condition. As a result, the manufacture or fabrication of the air bags is rendered more economical or cost-effective.

Obviously, many modifications and variations of the present invention are possible in light of the above teachings. For example, while it has been noted that the longitudinal extent of the horizontally disposed indicator lines 146 is such that they approach or have their terminal end portions 147 disposed substantially adjacent to the centerline or midline 143, the longitudinal extent of such indicator lines 146 could be such that the terminal end portions 147 are disposed midway between the side seam 138 and the centerline or midline 143 depending upon, for example, the particular air bag, its size, or its intended use. Similarly, in connection with the embodiment of FIG. 9, while the disposition of the vertical line 244 corresponds to the locus interconnecting the terminal end portions 147 of the plurality of horizontal lines 146 of the embodiment of FIG. 8, the location of vertical line 244 can likewise be altered to a position which is essentially midway between side seam 238 and centerline or midline 243. It is therefore to be understood that within the scope of the appended claims, the present invention may be practiced otherwise than as specifically described herein.

What is claimed as new and desired to be protected by Letters Patent, is:

1. An air bag for filling a void defined between opposed surfaces, comprising:

an inflatable container having opposite sides for engaging said opposed surfaces when said inflatable container is inflated, and end portions extending across said void from one of said opposed surfaces to the other one of said opposed surfaces; and visual indicating means disposed upon only one of said opposite sides and upon an end portion of said inflatable container for disposition within said void so as to provide visual indication directly upon said end portion of said inflatable container as to when said inflatable container is properly inflated and over-inflated.

2. An air bag as set forth in claim 1, wherein:

said inflatable container comprises a side edge portion which separates said opposite sides of said inflatable container from each other; and said indicating means comprises at least one indicating line which extends a predetermined distance from said side edge portion of said inflatable container and terminates at a terminal end portion upon said only one of said opposite sides of said inflatable container, whereby when said inflatable container is being inflated, as long as said terminal end portion of said at least one indicating line is not visible, said inflatable container is in a properly inflated condition, whereas if said terminal end portion of said at least one indicating line is visible, said inflatable container is over-inflated.

3. An air bag as set forth in claim 2, wherein:

said at least one indicating line comprises a plurality of indicating lines disposed parallel to each other.

4. An air bag as set forth in claim 2, wherein:

said at least one indicating line extends horizontally so as to be disposed parallel to a support surface upon which cargo loads, comprising said opposed surfaces defining said void, are supported.

5. An air bag as set forth in claim 2, wherein:

said at least one indicating line comprises printed indicia.

6. An air bag as set forth in claim 2, wherein:

said predetermined distance which defines the extent of said at least one indicating line is substantially equal to one-half the thickness of said inflatable container when said inflatable container is properly inflated.

7. An air bag as set forth in claim 1, wherein:

said inflatable container comprises a side edge portion which separates said opposite sides of said inflatable container from each other; and said indicating means comprises an indicating line which is disposed a predetermined distance from said side edge portion of said inflatable container and upon said only one of said opposite sides of said inflatable container, whereby when said inflatable container is being inflated, as long as said indicating line is not visible, said inflatable container is in a properly inflated condition, whereas if said indicating line is visible, said inflatable container is over-inflated.

8. An air bag as set forth in claim 7, wherein:

said indicating line extends vertically along said only one of said opposite sides of said inflatable container so as to be disposed perpendicular to a support surface upon which cargo loads, comprising said opposed surfaces defining said void, are supported.

9. An air bag as set forth in claim 7, wherein:

said indicating line comprises printed indicia.

10. An air bag as set forth in claim 7, wherein:

said predetermined distance which defines the disposition of said indicating line from said side edge portion of said inflatable container is substantially equal to one-half the thickness of said inflatable container when said inflatable container is properly inflated.

11. An air bag as set forth in claim 1, wherein:

said visual indicating means disposed upon said inflatable container comprises printed indicia.

12. An air bag for filling a void defined between opposed surfaces of cargo loads, comprising:

an inflatable container having opposite sides for engaging said opposed surfaces of said cargo loads when said inflatable container is interposed between said opposed surfaces of said cargo loads and inflated, and end portions interconnecting said opposite sides of said inflatable container and extending across said void defined between said opposed surfaces; and visual indicating means disposed upon only one of said opposite sides of said inflatable container wherein said visual indicating means is not visible when said inflatable container is properly inflated and is visible when said inflatable container is over-inflated.

13. An air bag as set forth in claim 12, wherein:

said inflatable container comprises a side edge portion which separates said opposite sides of said inflatable container from each other; and said visual indicating means comprises at least one indicating line which extends a predetermined distance from said side edge portion of said inflatable container and terminates at a terminal end portion which is within the vicinity of a central portion of said only one of said opposite sides of said inflatable container, whereby when said inflatable container is being inflated, as long as said terminal end portion of said at least one indicating line is not visible, said inflatable container is in a properly inflated condition, whereas if said terminal end portion of said at least one indicating line is visible, said inflatable container is over-inflated.

14. An air bag as set forth in claim 13, wherein:

said at least one indicating line comprises a plurality of vertically spaced, horizontal lines disposed parallel to each other and parallel to a support surface upon which said cargo loads are supported.

15. An air bag as set forth in claim 12, wherein:

said inflatable container comprises a side edge portion which separates said opposite sides of said inflatable container from each other; and said visual indicating means comprises an indicating line which is disposed a predetermined distance from said side edge portion of said inflatable container and upon said only one of said opposite sides of said inflatable container, whereby when said inflatable container is being inflated, as long as said indicating line is not visible, said inflatable container is in a properly inflated condition, whereas if said indicating line is visible, said inflatable container is over-inflated.

16. An air bag as set forth in claim 15, wherein:

said indicating line extends vertically along said only one of said opposite sides of said inflatable container so as to be disposed perpendicular to a support surface upon which said cargo loads are supported.

17. A method of visually determining the proper inflation of an air bag placed within a void defined between opposed surfaces of adjacent cargo loads, comprising the steps of:

providing an inflatable container comprising opposite sides for engaging said opposed surfaces of said adjacent cargo loads when said inflatable container is inserted between said adjacent cargo loads and inflated, and further comprising end portions extending across said void defined between said opposed surfaces of said adjacent cargo loads and interconnecting said opposite sides of said inflatable container;

providing visual indicating means upon only one of said opposite sides of said inflatable container and upon an end portion of said inflatable container, such that said visual indicating means will be disposed within said void defined between said adjacent cargo loads, for providing visual indication directly upon said end portion of said inflatable container as to when said inflatable container is properly inflated and over-inflated;

spacing said cargo loads from each other so as to define said void within which said inflatable container is to be disposed;

placing said inflatable container within said void defined between said cargo loads while said inflatable container is disposed in a deflated condition and in such a manner that said opposite sides of said inflatable container are disposed toward said opposed surfaces of said cargo loads; and inflating said inflatable container until said opposite sides of said inflatable container engage said opposed surfaces of said cargo loads so as to properly support said cargo loads whereby said visual indicating means disposed upon said end portion of said inflatable container will visually indicate directly upon said end portion of said inflatable container when said inflatable container is properly inflated and over-inflated.

18. A method as set forth in claim 17, wherein:

said step of providing said inflatable container with said visual indicating means comprises printing said visual indicating means upon said only one of said opposite sides of said inflatable container.

19. A method as set forth in claim 18, wherein:

said step of providing said inflatable container with said visual indicating means comprises forming said visual indicating means as at least one indicating line which extends a predetermined distance from a side edge portion, of said inflatable container which separates said opposite sides of said inflatable container from each other, and which terminates at a terminal end portion which is within the vicinity of a central portion of said only one of said opposite sides of said inflatable container such that upon inflation of said inflatable container, as along as said terminal end portion of said at least one indicating line is not visible, said inflatable container is in a properly inflated condition, whereas if said terminal end portion of said at least one indicating line is visible, said inflatable container is over-inflated.

20. A method as set forth in claim 18, wherein:

said step of providing said inflatable container with said visual indicating means comprises forming said visual indicating means as an indicating line which is disposed a predetermined distance from a side edge portion of said inflatable container which separates said opposite sides of said inflatable container from each other and upon said only one of said opposite sides of said inflatable container such that upon inflation of said inflatable container, as long as said indicating line is not visible, said inflatable container is in a properly inflated condition, whereas if said indicating line is visible, said inflatable container is over-inflated.

* * * * *